R. C. McATEER.
TRANSMISSION MECHANISM.
APPLICATION FILED FEB. 6, 1908.

907,630.

Patented Dec. 22, 1908.

WITNESSES.

INVENTOR.

UNITED STATES PATENT OFFICE.

ROBERT C. McATEER, OF CRAFTON, PENNSYLVANIA.

TRANSMISSION MECHANISM.

No. 907,630.  Specification of Letters Patent.  Patented Dec. 22, 1908.

Application filed February 6, 1908. Serial No. 414,585.

*To all whom it may concern:*

Be it known that I, ROBERT C. MCATEER, a resident of Crafton, in the county of Allegheny and State of Pennsylvania, have invented a new and useful Improvement in Transmission Mechanism; and I do hereby declare the following to be a full, clear, and exact description thereof.

My invention relates to friction transmission mechanism to be applied to the driving of automobiles, or for use in connection with other machinery where such transmission mechanism may be found desirable.

The object of my invention is to provide a simple form of transmission mechanism in which the wear of the parts is reduced to a minimum, and with a wide range of action in controlling the drive so as to provide for greater flexibility.

To these ends my invention comprises, generally stated, a power driven shaft, a shaft parallel thereto, and driven by said first mentioned shaft, frictional pinions on said shafts, means for independently operating each of said friction pinions, and friction disks adapted to be engaged by said friction pinions and shafts driven by said friction disks.

Figure 1:
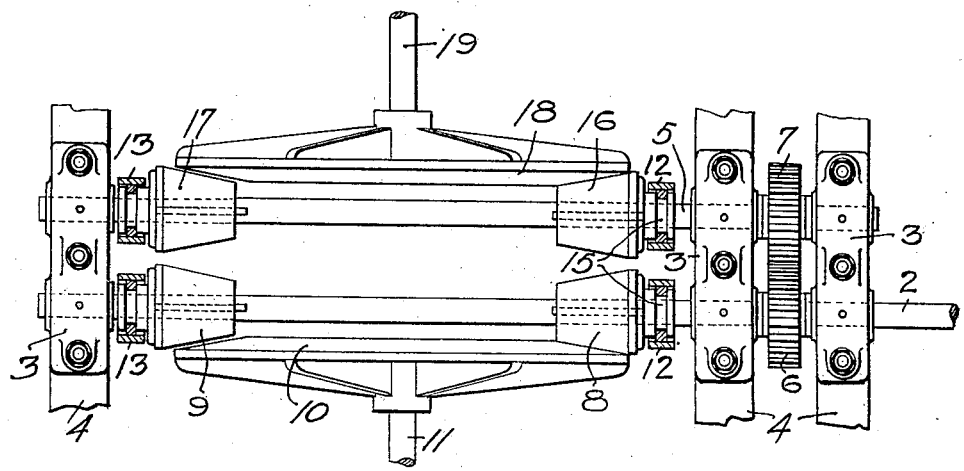
Figure 2:
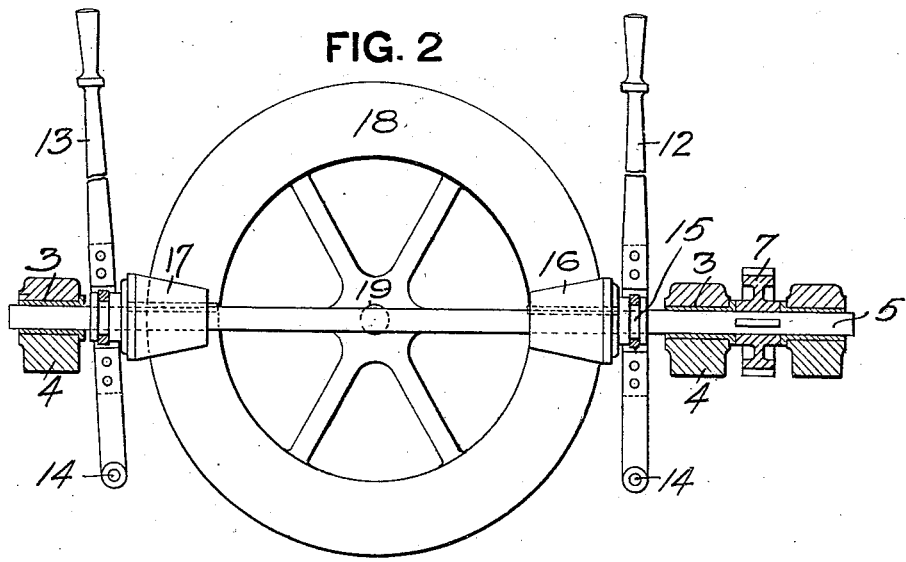
Figure 3:
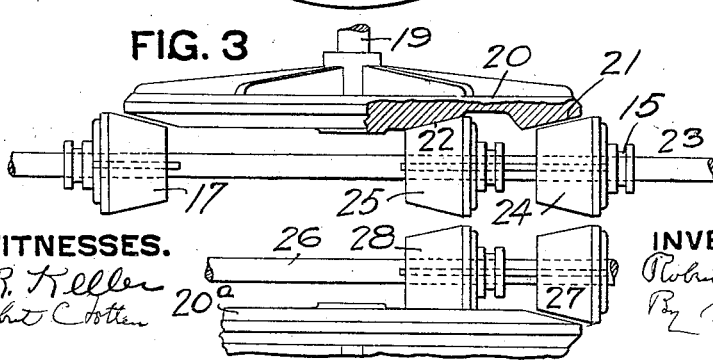

Referring to the accompanying drawing Figure 1 is a plan view of my improved friction transmission mechanism; Fig. 2 is a longitudinal sectional view of same; and Fig. 3 is a detail showing its application to high and low speed drive.

The numeral 2 designates a power driven shaft which may be connected up with any suitable motor, said shaft being journaled in the bearings 3 of a suitable frame 4. Parallel to the shaft 2 is the shaft 5 which is also journaled in the bearing blocks 3, said shaft being driven by the shaft 2 through the gears 6 and 7 mounted on said shafts 2 and 5, respectively.

Mounted on the shaft 2 are the bevel friction pinions 8 and 9, said pinions being connected to the shaft 2 by means of the ordinary feather and groove connection so as to be slidable thereon. These bevel friction pinions 8 may be formed of any suitable material, such as tarred fiber, and said pinions are adapted to be thrown into engagement with the miter-disk 10. A shaft 11 is connected to the miter-disk 10. In order to shift the friction pinions 8 and 9 to and fro on the shaft 2 levers 12 and 13 are provided, said levers being pivoted at 14 and engaging the annular grooves 15 of the bevel pinions 8 and 9.

Mounted on the shaft 5 are the bevel pinions 16 and 17 also connected to said shaft 5 by means of the feather and groove connection and provided with levers for shifting said pinions back and forth on said shaft 5. These pinions 16 and 17 are adapted to be thrown into or out of engagement with the miter-disk 18 on the shaft 19.

When my improved friction transmission is in use the power is applied to drive the shaft 2 and through the gears 6 and 7 the power is transmitted to the shaft 5. This will act to drive said shafts in opposite directions. In the forward drive the friction pinions 8 and 16 will be in engagement with the respective disks 10 and 18, and power will thus be transmitted to drive the shafts 11 and 19 in the same direction. When it is desired to reverse the direction of rotation of the shafts 11 and 19 the levers 12 are operated to throw the friction pinions 8 and 16 out of engagement with the miter-disks 10 and 18 and the levers 13 are employed to throw the friction pinions 9 and 17 into engagement with the miter-disks 10 and 18. This will act to reverse the direction of rotation of the shafts 11 and 19. If, again, it is desired to rotate only the shaft 11, the friction pinions 9, 16 and 17 may be thrown out of engagement with the miter-disks and the friction pinion 8 alone is in frictional contact with the miter-disk 10. In this way only the shaft 11 is driven and where this shaft 11 is connected up to the rear axle of an automobile only the rear wheel on that side is driven, while the opposite wheel on the same axle acts as a fulcrum to turn the vehicle, thus permitting of the turning of the vehicle in a very short space. Or, if desired, the friction pinion 17 may be thrown at the same time into engagement with the miter-disk 18, whereupon the wheel connected up to the shaft 19 will be driven in the opposite direction from the wheel connected up to the shaft 11, and in this manner the turning of the vehicle is effected with great rapidity and in a short space. Again, the reversing of the shafts 11 and 19 is accomplished with great ease and rapidity by throwing the friction pinions 9 and 17 into engagement with the miter-disks 10 and 18 and throwing out the friction pinions 8 and 16. Or, if desired, the friction pinions 9 and 17 may be thrown into engagement with the miter-disks 10 and 18 even when the forward drive is on and these friction disks 9 and 17 may be employed as a brake for controlling the speed.

By having the two parallel shafts with friction pinions engaging separate disks, the wear is divided between the pinions and as a consequence the life of the pinions is extended and the saving in this respect is very great. The independent operation of each of the friction pinions increases the range of work which may be done by the transmission mechanism and greater flexibility is obtained.

In Fig. 3 I have illustrated my invention as it may be applied to high and low speed in the operation of an automobile in which the miter-disks 20 and 20ª have the two bevel faces 21 and 22. The shaft 23 has the bevel friction pinions 24 and 25 which are adapted to engage with the bevel faces 21 and 22, respectively, of the miter-disk 20. The shaft 26 has the friction pinions 27 and 28. In this manner provision is made for high and low speed in the forward drive.

What I claim is:

1. In friction transmission mechanism, the combination of a power driven shaft, a shaft parallel thereto, connections between said shafts for driving said second named shaft, sliding friction wheels on said shafts, each independently operated, and friction disks with which said friction wheels are adapted to engage.

2. In friction transmission mechanism, the combination of a power driven shaft, a shaft parallel thereto, connections between said shafts for driving said second named shaft, slidable friction wheels at opposite ends of said shafts, each independently operated, and friction disks with which said friction wheels are adapted to engage.

In testimony whereof, I the said ROBERT C. McATEER have hereunto set my hand.

ROBERT C. McATEER.

Witnesses:
ROBERT C. TOTTEN,
J. R. KELLER.